Oct. 14, 1958  R. E. PHELON  2,856,550
ROTOR FOR AN ELECTRIC GENERATOR
Filed Jan. 31, 1957  2 Sheets—Sheet 2
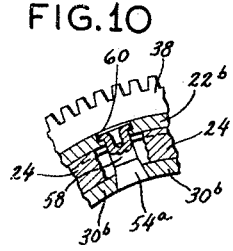
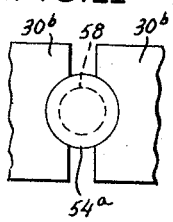
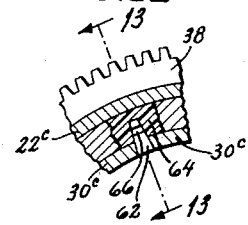
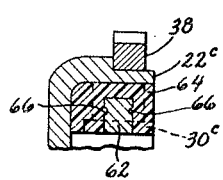
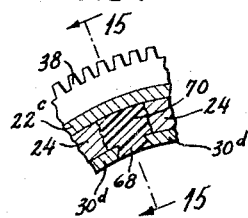
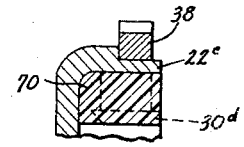
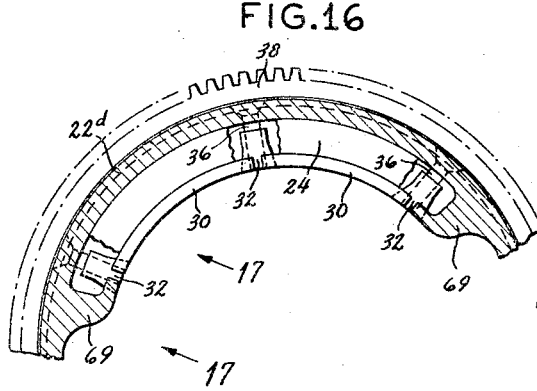
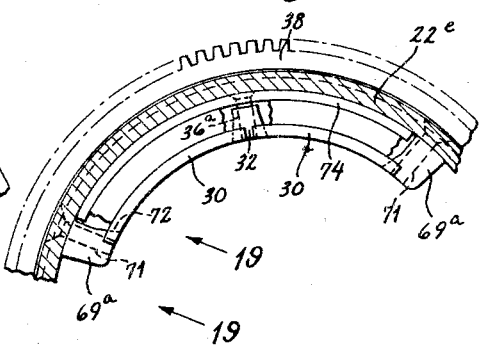
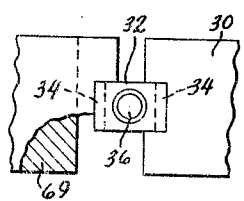
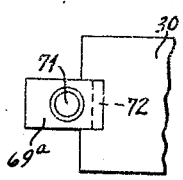
INVENTOR.
RUSSELL E. PHELON
BY Teller & McCormick
ATTORNEYS United States Patent Office 2,856,550
Patented Oct. 14, 1958

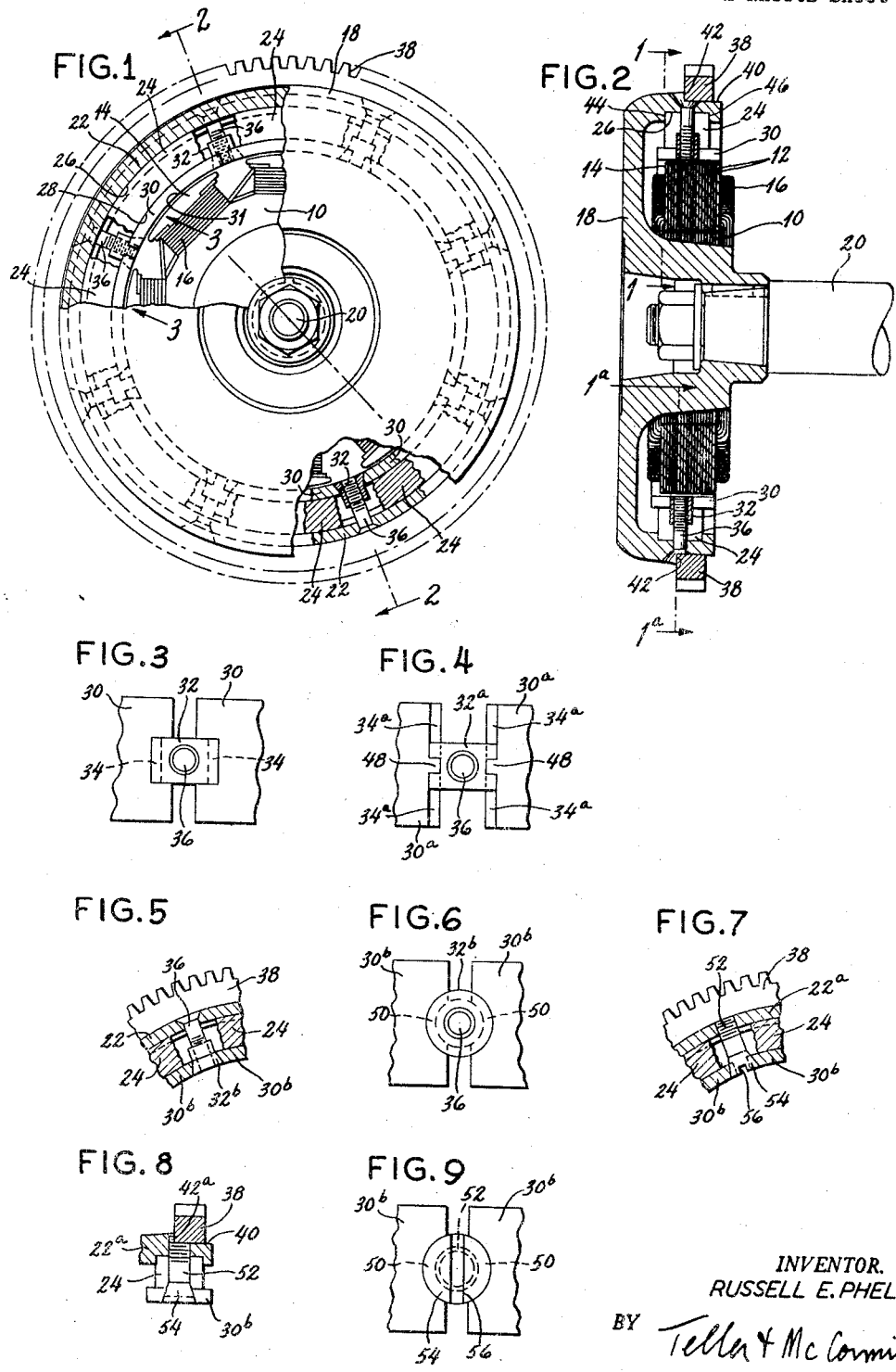

2,856,550
ROTOR FOR AN ELECTRIC GENERATOR
Russell E. Phelon, Longmeadow, Mass.
Application January 31, 1957, Serial No. 637,550
17 Claims. (Cl. 310—153)

The invention relates to a rotor for an electric generator of the flywheel type, and more particularly to such a rotor having a series of radially charged circumaxially spaced permanent magnets on the interior of the flywheel rim and having a series of pole pieces respectively carried by said magnets at the inner faces thereof.

The general object of the invention is to provide an improved means for mechanically holding the pole piece and the magnets in fixed relationship with each other and with the flywheel. This mechanical holding means makes it possible to use oriented permanent magnetic materials whose qualities would suffer by exposure to the temperature required for brazing or other fusion processes.

Further objects of the invention are to provide various detents of construction and arrangement whereby the foregoing more general object is attained.

The drawings show several embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

Fig. 1 is a front view of a generator embodying the invention, an upper portion being broken away to show a section along the line 1—1 of Fig. 2 and a lower portion being broken away to show a section along the line 1ª—1ª of Fig. 2.

Fig. 2 is a vertical sectional view taken along the line 2—2 of Fig. 1.

Fig. 3 is an enlarged fragmentary view taken in the direction of the arrows 3, 3 in Fig. 1.

Fig. 4 is a view similar to Fig. 3, but showing an alternative construction.

Fig. 5 is a fragmentary view similar to a portion of Fig. 1, but showing another alternative construction.

Fig. 6 is a view similar to Fig. 3 but showing the embodiment of the invention shown in Fig. 5.

Fig. 7 is a fragmentary view similar to a portion of Fig. 1 and showing another alternative construction.

Fig. 8 is a fragmentary view similar to a portion of Fig. 2 and showing the construction shown in Fig. 7.

Fig. 9 is an enlarged fragmentary view similar to Fig. 3, but showing the construction shown in Figs. 7 and 8.

Fig. 10 is a fragmentary view similar to a portion of Fig. 1 and showing another alternative construction.

Fig. 11 is an enlarged fragmentary view similar to Fig. 3, but showing the construction shown in Fig. 10.

Fig. 12 is a fragmentary view similar to a portion of Fig. 1 and showing another alternative construction.

Fig. 13 is a fragmentary sectional view taken along the line 13—13 of Fig. 12.

Fig. 14 is a view similar to Fig. 12, but showing another alternative embodiment of the invention.

Fig. 15 is a fragmentary sectional view taken along the line 15—15 of Fig. 14.

Fig. 16 is a fragmentary view similar to a portion of Fig. 1 and showing another alternative construction.

Fig. 17 is an enlarged fragmentary view taken in the direction of the arrows 17, 17 in Fig. 16.

Fig. 18 is a view similar to Fig. 16 but showing another embodiment of the invention.

Fig. 19 is an enlarged fragmentary view taken in the direction of the arrows 19, 19 in Fig. 18.

*Figs. 1 to 3*

Figs. 1 to 3 show one generator embodying the invention, but there may be considerable variation in details from the generator so shown. The generator comprises a stator 10 which may be carried by a stationary frame, not shown. The stator does not, of itself, constitute a part of the present invention. The stator as shown is merely an example. Said stator 10 as shown comprises a laminated plate 12 with outwardly extending generally radial poles 14, 14 with outer faces at the periphery which are concentric with a central axis. As shown, there is an annular series of equally spaced poles and there may be eight poles. The several poles 14, 14 have windings 16, 16 and when said poles and windings are in an annular series, the windings are electrically connected with each other in series.

The generator further comprises a rotor carried by or formed as a part of a rotatable flywheel 18 carried by a shaft 20. The axis of the shaft is coincident with said central axis of the stator. As shown, the rotor is generally similar to that disclosed in the Phelon Patent No. 2,472,313, dated June 7, 1949, for Flywheel Magneto. The main body of the flywheel includes an annular portion or rim 22 which supports a plurality of permanent magnets 24, 24. The magnets 24, 24 are arranged in an arcuate series and, as shown, there is a complete annular series of magnets which are uniformly spaced. When the stator is of the salient pole type as shown, the number of magnets in the annular series is the same as the number of stator poles, and as shown this number is eight.

The annular portion or rim 22 of the flywheel, as shown, is formed of magnetic metal and it magnetically connects the several magnets 24. Said rim 22 has an inner annular face 26 concentric with the axis of rotation and each magnet has an outer preferably arcuate face which engages and fits said cylindrical face 26. Each magnet also has an inner preferably arcuate face 28 also concentric with the axis of rotation. Connected with each magnet is a pole piece 30 having an outer face engaging the inner face of the magnet and having an inner arcuate face 32 concentric with the axis of rotation. The flywheel and the magnets and the pole pieces are so related to the stator that the inner faces 31 of the pole pieces move in close proximity to the outer faces of the stator poles 14, 14. The pole pieces 30, 30 are of such length that there is a gap between the adjacent ends of each two adjacent pole pieces. The two pole pieces on each two immediately adjacent magnets have oppositely facing end faces 34, 34 that define said gap.

The several magnets 24, 24 are charged radially, each two immediately adjacent magnets being charged in opposite directions. The portion or rim 22 of the flywheel constitutes a magnetic connector between each two adjacent magnets of opposite polarity, and for any two adjacent magnets a magnetic circuit is established through said magnets and through said connector 22 and through the corresponding pole pieces 30, 30. For the next two adjacent magnets, including one of the first two magnets, there is a similar but opposite magnetic circuit. As the rotor is rotated the successive opposed magnetic circuits are completed through adjacent stator poles 14, 14, the result being that the magnetic circuits through said poles is successively reversed with the resulting generation of alternating current in the series windings 16, 16.

As thus far described, the construction and operation of the generator is in accordance with prior knowledge. The rotor as thus far described is in accordance with the disclosure in the aforesaid patent. The present invention relates primarily to the mechanical construction of the rotor rather than to any novel electrical or magnetic features.

As disclosed in said patent, the magnets were connected with the flywheel rim and with the pole pieces by brazing or the like. In accordance with the present invention there is no brazing or the like, and the pole pieces 30, 30 are connected with each other and with the magnets 24, 24 by mechanical means, and said pole pieces by their engagement with the magnets hold said magnets in place and in engagement with the inner face of the flywheel rim 22.

Wedges or wedge-like means of nonmagnetic material are provided between the adjacent ends of the several pole pieces 30, 30, and said wedges or means engage the opposed end faces of each two immediately adjacent pole pieces and they serve to hold said pole pieces in their spaced relationship and preferably to press them away from each other. When said pole pieces are pressed away from each other they are also forced outwardly against the magnets 24, 24 which in turn are forced outwardly against the flywheel rim 22. Said wedges or means serve to clamp and lock all of said pole pieces and said magnets and said flywheel rim in fixed relationship with each other.

The details of the wedges or wedge-like means may be widely varied, but one suitable construction is shown in Figs. 1 to 3. As best shown in Fig. 3, the adjacent end portions of each two pole pieces 30, 30 receive between them a wedge-like member 32 formed of brass or other nonmagnetic material, the opposite end faces 34, 34 of the two pole pieces converging outwardly to conform to the taper of the wedge. As shown, the outwardly converging faces 34, 34 are within notches in the pole pieces, and the member 32 enters and fits said notches. Devices are provided for moving said members 32, 32 outwardly and as shown said devices are radial screws 36, 36. Each radial screw 36 extends through a hole in the flywheel rim 22 and is threaded into a threaded hole in the wedge-like member. Each screw has an outer head with a screw driver slot therein. By means of the screws, the wedge-like members 32, 32 can be forced outwardly to press the two pole pieces away from each other. Said members fit the notches in the pole pieces, and thus said pole pieces and said members are provided with interengaging shoulders which prevent relative axial movements between said pole pieces and said members.

During assembly all of the magnets 24, 24 and all of the pole pieces 30, 30 are put in place, being held if necessary by a temporary fixture. All of the members 32, 32 and all of the screws 36, 36 are put in place and then all of the screws are tightened to move all of the wedge members outwardly as nearly uniformly as is reasonably possible. Outward movement of the wedge members causes said members and said pole pieces to constitute a continuous circular arch under pressure. The pressure tends to cause said circular arch to expand, with the result that the pole pieces are forced outwardly against the magnets to firmly hold them in place against the flywheel rim 22.

An annular gear 38 may be required on the flywheel 18. In order to provide for the gear 38, the peripheral portion or rim of the flywheel is machined as indicated at 40 to provide a cylindrical surface of the proper size for receiving said gear. The machining is done after the screws 36, 36 have been put in place and tightened and the machining includes a portion of the head of each screw, and said machining terminates at a shoulder 42 extending through the head of each screw. Upon the completion of machining the gear 38 is pressed into place on the rim 22 with a force fit. The engagement of the gear 38 with the shoulders 42 on the heads of the screw 36 prevents any loosening of said screws.

Preferably, but not necessarily, the magnets 24, 24 are ground accurately at least at the sides thereof adjacent the open side of the flywheel and the flywheel is machined to provide a shoulder 44 for engaging the sides of the magnets. The shoulder prevents any movement of the magnets in one axial direction. As shown, the magnets are ground accurately to size at both sides and the flywheel is machined to provide two shoulders 44 and 46 fitting the magnets at both sides. The shoulders 44 and 46 prevent movement of the magnets in either axial direction.

*Fig. 4*

The construction shown in Fig. 4 is very similar to that shown in Figs. 1 to 3. Pole pieces 30a, 30a are provided similar to the pole pieces 30, 30, and nonmagnetic wedge-like members 32a, 32a are provided similar to the members 32, 32. The pole pieces 30a, 30a, instead of having inclined faces 34, 34 within a notch, have inclined faces 34a, 34a at opposite sides of projections 48, 48 on said pole pieces. The members 32a, 32a have notches for receiving the projections 48, 48 and have inclined opposite walls which converge outwardly in conformity with the inclined faces 34a, 34a. The function and use of the members 32a, 32a are substantially the same as those of the members 32, 32 and repetition of the description is unnecessary.

*Figs. 5 and 6*

The construction shown in Figs. 5 and 6 is also very similar to that shown in Figs. 1 to 3. Pole pieces 30b, 30b are provided similar to the pole pieces 30, 30, and nonmagnetic wedge-like members 32b, 32b are provided similar to the members 32, 32. The pole pieces 30b, 30b, instead of having inclined faces 34a, 34a within a notch, have matching partly conical recesses 50, 50 having inclined faces which receive and fit the members 32b, 32b which have their opposite walls converging outwardly to fit said faces of said recesses. The function and use of the members 32b, 32b are substantially the same as those of the members 32, 32 and repetition of the description is unnecessary.

*Figs. 7 to 9*

The construction shown in Figs. 7 to 9 is generally similar to that shown in Fig. 5 with the exception that the wedge-like member is integral with the screw instead of being separate therefrom. The pole pieces 30b, 30b are or may be the same as those shown in Fig. 5 with matching partly conical recesses 50, 50. There is provided an integral wedge member and screw 52 having an inner head 54 which has a tapered wall that fits the inclined faces of said recesses 50, 50. The entire combined wedge member and screw is formed of nonmagnetic metal. The outer end of the screw 52 is threaded and entered in a threaded hole in the flywheel rim 22a which is like the flywheel rim 22 except as to the threaded holes. The screw 52 has a screw driver slot 56 in the inner conical head. By means of said slot the screw 52 can be turned to force the conical head 54 into engagement with the pole pieces and so as to apply pressure as previously described. The several screw heads 54 engage the pole pieces to provide a continuous circular arch as previously described.

The screws 52 are preferably put in place and tightened before the flywheel is machined for the gear 38. The machining extends into each screw 52 to form a shoulder 42a thereon and said shoulder when engaged by the gear 38 prevents the screw from turning.

*Figs. 10 and 11*

The construction shown in Figs. 10 and 11 is somewhat similar to that shown in Figs. 7 to 9, the more important difference being that a rivet 58 is substituted for the screw 52. The magnets 24, 24 and the pole pieces 30b, 30b are or may be exactly the same as shown in Fig. 7. The rivet has an inner head 54a which is or may be the same as the head 54 of the screw 52. The outer portion of each rivet 58 extends into a recessed unthreaded counterbored hole 60 in the flywheel rim 22b which is, or may be, generally similar to the flywheel rim 22 except for said holes. The outer portion of each rivet within the corresponding hole is upset so as to be firmly held in place. The entire rivet is formed of nonmagnetic metal. The several rivet heads 54a, 54a and the pole pieces 30b, 30b provide a continuous circular arch such as previously described.

Figs. 12 and 13

Fig. 12 is a fragmentary view similar to a portion of Fig. 1, but showing a wedge member 62 having outwardly converging walls which engage inclined edge faces on notches in pole pieces 30c, 30c similar to the pole pieces 30, 30. Each wedge member 62 is formed of nonmagnetic metal and the several wedge members are adapted to be driven or forced into positions between the pole pieces. The several wedge members 62, 62 and the pole pieces 30c, 30c provide a continuous circular arch.

The several wedge members 62 are not engaged with nor formed as parts of screws or rivets, and means other than screws or rivets are provided for holding the members in place. As shown in Fig. 13, the entire space around the outer ends of the wedge members and between the pole pieces and the flywheel is filled with an annular body 64 of nonmagnetic castable material which may be an artificial resin or a soft nonmagnetic metal. The flywheel has a rim 22c generally similar to the rim 22 but without holes. The material of the body 64 enters the last said space in a fluid or plastic condition and then hardens to grip and retain the wedge members. Preferably each wedge member is provided with grooves 66, 66 or other irregularities which enable the material of the body 64 to positively engage the wedges.

The rim 22c may further differ from the rim 22 by the omission of the shoulders 44 and 46. Said shoulders are desirable but not necessary when there is an annular body such as 64 for holding the magnets.

Figs. 14 and 15

The construction shown in Figs. 14 and 15 resembles that shown in Figs. 12 and 13 in that there are no screws or rivets for holding the wedges. Instead of separate metallic wedge members, such as 62 there are provided nonmagnetic wedge members 68 formed integrally with an annular body 70 of nonmagnetic castable material, the body 70 being generally similar to the body 64 and fitting the space between the pole pieces and the flywheel. The wedge members 68 are between the pole pieces 30d, 30d which are similar to the pole pieces 30, 30 except that they are without end notches. The integral wedge members 68 have approximately the same function as the other wedge members that have been described.

Figs. 16 and 17

Figs. 16 and 17 show a rotor having less than a complete arcuate annular series of magnets and pole pieces. As shown, there is a much shorter arcuate series of magnets which series may comprise only two magnets with corresponding pole pieces.

Any one of the several disclosed wedge-like members might be used for holding the pole pieces and the magnets, but as shown the holding members are like those shown in Figs. 1 to 3. The magnets 24, 24, and the pole pieces 30, 30 and the holding members 32, 32 and the screws 36, 36 are or may be exactly like those shown in said Figs. 1 to 3. The flywheel has a rim 22d generally similar to the flywheel rim 22, but adapted for engaging only two magnets. At the ends of the magnet engaging portion of the rim 22d are abutments 69, 69 which are in fixed relation to said rim 22d and which are shown as being integral therewith. These abutments are positioned and shaped to engage the immediately adjacent wedge members 32, 32. The wedge members and the pole pieces constitute a continuous arch, under pressure, between said abutments 69, 69, with the result that said pole pieces are held in their spaced relationship with each other and in fixed relationship with said magnets and with the further result that said pole pieces hold said magnets in fixed relationship with said flywheel rim.

The flywheel is provided with a suitable counterbalance, not shown, to compensate for the weight of the magnets and associated parts shown in Fig. 16.

Figs. 18 and 19

Figs. 18 and 19 show a construction somewhat similar to that shown in Figs. 16 and 17, but having separate abutments 69a, 69a in lieu of the integral abutments 69, 69. The abutments 69a, 69a are held in place by screws 71, 71 similar to the screws 36, and said abutments 69a, 69a have faces 72, 72 positioned and shaped to fit the faces 34, 34 on the immediately adjacent pole pieces 30, 30. Inasmuch as the abutments 69a, 69a directly engage the pole pieces, said abutments are formed of nonmagnetic metal.

Fig. 18 further illustrates the fact that the rim of the flywheel need not necessarily be formed of magnetic metal. The flywheel may be formed of nonmagnetic metal and may have a rim 22e. A separate connector 74 formed of magnetic metal may be provided for magnetically connecting the magnets 24, 24 at the outer faces thereof. Such a separate magnetic connector is disclosed in the Phelon Patent No. 2,538,534, dated January 16, 1951, for Rotor for Flywheel Magneto. The connector 74 has an outer arcuate face which engages the inner arcuate face of the rim 22e and it has an inner arcuate face which engages the outer arcuate faces of the magnets.

A single wedge member 32 is provided between the two pole pieces 30, 30, this member 32 being held by a screw 36a similar to the screws 36 but engaging the member 74 rather than the rim 22e. The single wedge member and the two pole pieces constitute a continuous arch, under pressure, between said abutments 69a, 69a, with the result that said pole pieces are held in their spaced relationship with each other and in fixed relationship with said magnets and with the further result that said pole pieces hold said magnets in fixed relationship with the connecting member 74 which in turn is held in fixed relationship with the flywheel rim 22e.

The invention claimed is:

1. A rotor for an electric generator which includes a stator having a plurality of poles with outer faces concentric with a central axis, said rotor comprising in combination, a rotatable flywheel having an annular rim adapted to surround at least a portion of the stator, a series of at least two similar magnets within said flywheel rim and carried thereby which magnets are adjacent each other and have outer and inner faces concentric with the axis of rotation, alternate magnets of the series being radially charged in opposite directions and being magnetically connected with each other at their said outer faces, a series of at least two magnetic pole pieces respectively engaging said magnets and having outer faces fitting the inner faces of the magnets and having inner arcuate faces concentric with the axis of rotation and positioned to move in a path closely adjacent the periphery of a stator such as aforesaid and at least two of said pole pieces having their end faces adjacent each other and spaced apart, and a nonmagnetic means connected with said flywheel and at least partly interposed in each space between said end faces of two pole pieces and engaging said end faces, the last said means serving to hold said pole pieces in their spaced relationship with each other and in fixed relationship with said magnets and for resultantly serving to hold said magnets in fixed relationship with said flywheel rim.

2. A rotor as set forth in claim 1, wherein the flywheel is formed of magnetic metal, and wherein the outer faces of the magnets directly engage the rim of the flywheel so that said rim serves to magnetically connect said magnets.

3. A rotor for an electric generator which includes a stator having a plurality of poles with outer faces concentric with a central axis, said rotor comprising in combination, a rotatable flywheel having an annular rim adapted to surround at least a portion of the stator, a series of at least two similar magnets within said flywheel rim and carried thereby which magnets are adjacent each other and have outer and inner faces concentric with the axis of rotation, alternate magnets of the series being radially charged in opposite directions and all of said magnets being magnetically connected with each other at their outer faces, a series of at least two magnetic pole pieces respectively engaging said magnets and having outer faces fitting the inner faces of the magnets and having inner arcuate faces concentric with the axis of rotation and positioned to move in a path closely adjacent the periphery of a stator such as aforesaid and adjacent pole pieces having their adjacent end faces spaced apart, and at least three nonmagnetic members respectively in forced engagement with the end faces of the pole pieces for applying pressure circularly so that members and said pole pieces constitute an arcuate arch with the result that said pole pieces are held in their spaced relationship with each other and in fixed relationship with said magnets and with the further result that said pole pieces hold said magnets in fixed relationship with said flywheel rim.

4. A rotor as set forth in claim 3, wherein said three nonmagnetic members in forced engagement with the end faces of the pole pieces are wedge-like, and wherein each of said members has a pair of opposed converging faces with at least one face of each pair engaging an end face of one of said pole faces.

5. A rotor as set forth in claim 4, wherein the flywheel is formed of magnetic metal, wherein the outer faces of the magnets directly engage the rim of the flywheel so that said rim serves to magnetically connect said magnets, and wherein the pressure engagement of the pole pieces with the magnets results in pressure engagement of the magnets with the rim of the flywheel.

6. A rotor for an electric generator which includes a stator having a plurality of poles with outer faces concentric with a central axis, said rotor comprising in combination, a rotatable flywheel formed of magnetic metal and having an annular rim adapted to surround at least a portion of the stator, a series of at least two adjacent similar magnets within said flywheel rim and carried thereby which magnets have outer and inner faces concentric with the axis of rotation, alternate magnets of the series being radially charged in opposite directions and having their outer faces in engagement with the flywheel rim so that said rim serves to magnetically connect said magnets, a series of at least two magnet pole pieces respectively engaging said magnets and having outer faces fitting the inner faces of the magnets and having inner arcuate faces concentric with the axis of rotation and positioned to move in a path closely adjacent the periphery of a stator such as aforesaid and adjacent pole pieces having their adjacent end faces spaced apart and converging outwardly, at least three nonmagnetic wedge-like members having outwardly converging faces which members are respectively in forced engagement with the four end faces of the two pole pieces, and at least three radial screws connected with the flywheel and respectively with the three wedge-like members for moving said wedge-like members outwardly relative to said pole pieces so as to apply pressure circularly to forcibly hold said pole pieces in their spaced relationship with each other and in pressure engagement with said magnets and so as to resultantly hold said magnets in fixed relationship with said flywheel rim.

7. A rotor as set forth in claim 6, wherein said flywheel has an annular exterior shoulder, wherein each radial screw extends through said flywheel rim and has a shoulder aligning with said flywheel shoulder, and wherein a member is provided on said flywheel which engages said shoulders on the flywheel and on the screws to prevent said screws from turning after they have served to move said wedge-like members.

8. A rotor as set forth in claim 6, wherein each wedge-like member is frusto-conical, and wherein each screw is integral with the corresponding member and has threaded engagement with said flywheel.

9. A rotor for an electric generator which includes a stator having a plurality of poles with outer faces concentric with a central axis, said rotor comprising in combination, a rotatable flywheel formed of magnetic metal and having an annular rim adapted to surround at least a portion of the stator which rim has a cylindrical interior face concentric with the axis of rotation, an annular series of similar circumaxially spaced magnets within said flywheel rim having outer faces engaging said interior face of said rim so that the rim serves to magnetically connect said magnets, alternate magnets of said series being radially charged in opposite directions and all of said magnets having inner arcuate faces concentric with the axis of rotation, and annular series of similar circumaxially spaced magnetic pole pieces respectively engaging said magnets which pole pieces have outer faces fitting the inner faces of the magnets and have inner arcuate faces concentric with the axis of rotation and positioned to move in a path closely adjacent the periphery of a stator such as aforesaid, and nonmagnetic means connected with said flywheel and at least partly interposed in the several spaces between the several pole pieces so that said means and said pole pieces constitute a continuous circular arch with the result that said pole pieces are held in their spaced relationship with each other and in fixed relationship with said magnets and with the further result that said pole pieces hold said magnets in fixed relationship with said flywheel rim.

10. A rotor as set forth in claim 9, wherein said flywheel rim is provided with an integral inwardly projecting rib engaging said magnets at the corresponding sides thereof for preventing magnet movement in one axial direction.

11. A rotor as set forth in claim 9, wherein said means at least partly interposed in the several spaces between the several pole pieces comprises separate wedge-like members having outwardly converging faces and located between said pole pieces which members are in forced engagement with the end faces of the pole pieces, and wherein a plurality of devices extend through radial holes in the flywheel rim and are connected respectively with said wedge-like members for holding said members in their said forced engagement with said pole pieces so that said continuous circular arch is under compression throughout its entire extent.

12. A rotor as set forth in claim 11, wherein said devices connected with said wedge-like members are radial screws which serve to move said members outwardly relatively to said pole pieces so as to apply pressure circularly to forcibly hold said pole pieces in their spaced relationship with each other and in pressure engagement with said magnets and so as to resultantly hold said magnets in fixed relationship with said flywheel rim.

13. A rotor for an electric generator which includes a stator having a plurality of poles with outer faces concentric with a central axis, said rotor comprising in combination, a rotatable flywheel formed of magnetic metal and having an annular rim adapted to surround at least a portion of the stator which rim has a cylindrical interior face concentric with the axis of rotation, an annular series of similar circumaxially spaced magnets within said flywheel rim and having outer faces engaging said interior face of said rim so that the rim serves to magnetically connect said magnets, alternate magnets of said series being radially charged in oppoiste directions all of said magnets having inner faces concentric with the axis of rotation, an annular series of similar circumaxially spaced magnetic pole pieces respectively engaging said magnets which pole pieces have outer faces fitting the inner faces of the magnets and have inner arcuate faces concentric with the axis of rotation and positioned to move in a path closely adjacent the periphery of a stator such as aforesaid, and nonmagnetic means connected with said flywheel and partly interposed in the several spaces between the several magnets and the several pole pieces so that said means and said pole pieces constitute a continuous circular arch with the result that said pole pieces are held in their spaced relationship with each other and in fixed relationship with said magnets and with the further result that said pole pieces hold said magnets in fixed relationship with said flywheel rim, the last said means including an annular body of nonmagnetic castable material filling the spaces between the magnets and engaging said flywheel rim.

14. A rotor as set forth in claim 13, wherein said nonmagnetic means partly interposed in the spaces between the pole pieces includes metallic wedges located between said pole pieces and extending outwardly beyond them, and wherein said annular body of castable material surrounds the outwardly extending portions of said wedges to retain them in place.

15. A rotor for an electric generator which includes a stator having a plurality of poles with outer faces concentric with a central axis, said rotor comprising in combination, a rotatable flywheel having an annular rim adapted to surround at least a portion of the stator, a series of at least two similar magnets within said flywheel rim and carried thereby which magnets are adjacent each other and have outer and inner faces concentric with the axis of rotation, said two magnets being radially charged in opposite directions and being magnetically connected with each other at their said outer faces, a series of at least two pole pieces circularly spaced from each other and respectively engaging said magnets which pole pieces have outer faces fitting the inner faces of the magnets and have inner arcuate faces concentric with the axis of rotation and positioned to move in a path closely adjacent the periphery of a stator such as aforesaid, two abutments fixedly connected with the flywheel rim at the interior thereof and located at the ends of the series of pole pieces, and a member between the adjacent ends of two pole pieces and in forced engagement therewith for applying pressure which is transmitted circularly through all of said pole pieces to said abutments so as to hold said pole pieces in place.

16. A rotor as set forth in claim 15, wherein said abutments are formed integrally with said flywheel rim.

17. A rotor as set forth in claim 15, wherein said abutments are structully separate from said flywheel rim, and wherein screws are provided for normally holding said abutments in place.

References Cited in the file of this patent

UNITED STATES PATENTS

| | | |
|---|---|---|
| 2,475,776 | Brainard | July 12, 1949 |
| 2,582,866 | Harsch | Jan. 15, 1952 |

FOREIGN PATENTS

| | | |
|---|---|---|
| 396,017 | Great Britain | Oct. 19, 1931 |
| 875,227 | Germany | Apr. 30, 1953 |